May 29, 1956     I. A. SIMPKINS     2,747,330
COMBINATION PLANT CUTTER AND LIQUID APPLICATOR
Filed May 24, 1954
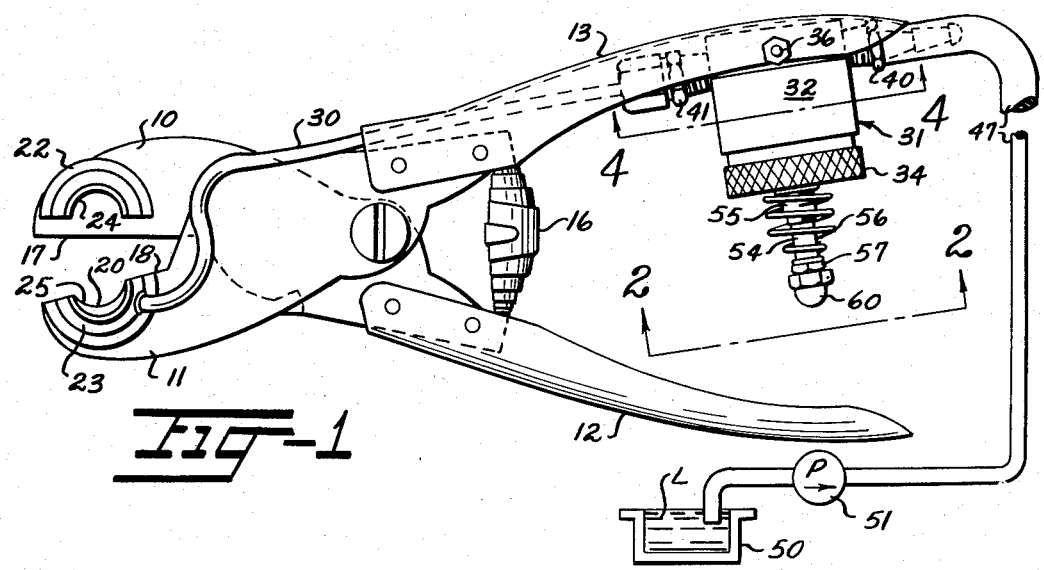
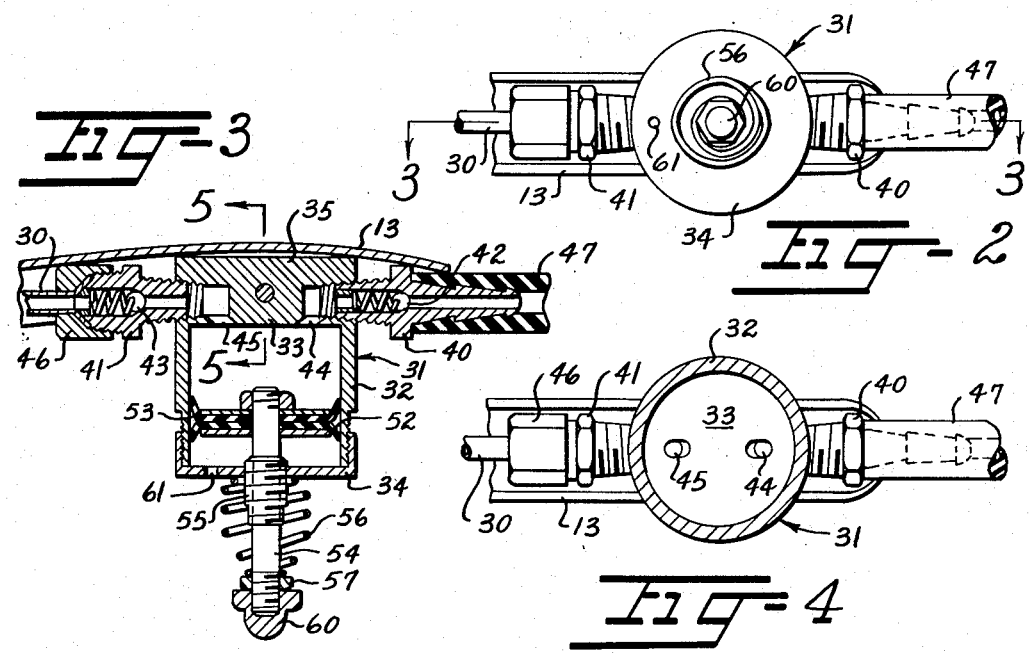
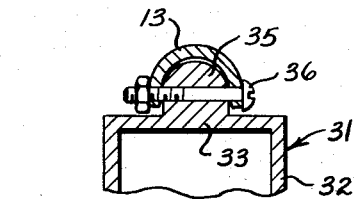
INVENTOR:
ISAAC A. SIMPKINS
BY Eaton + Bell
ATTORNEYS.

United States Patent Office 2,747,330
Patented May 29, 1956

2,747,330

COMBINATION PLANT CUTTER AND LIQUID APPLICATOR

Isaac A. Simpkins, Thomasville, N. C.

Application May 24, 1954, Serial No. 431,997

4 Claims. (Cl. 47—1)

This invention relates to implements for applying liquid to plants or the like which have been cut and, more especially, to an improved pump structure particularly devised for use in association with implements of this character for automatically emitting a predetermined amount of liquid when the shears of such an implement are closed. The improved pump structure is particularly devised for use with an implement of the character disclosed in my copending application Serial Number 289,312, filed May 22, 1952, now Patent No. 2,726,484 entitled Implement for Applying Liquid to Plants, of which the present application is a continuation-in-part.

It is an object of this invention to provide an improved pump structure for combination plant cutters and liquid applicators of the character described, which pump structure operates with greater efficiency than similar devices heretofore employed to draw liquid thereinto upon closing the shears of the cutting implement and which emits the liquid therefrom to a point adjacent the shears as the shears are opened and which pump structure has a minimum of parts, may be economically constructed and easily repaired.

It is another object of this invention to provide a pump structure of the character described comprising a cylinder adapted to be secured to one of the handles of the implement and having substantially alined diametrically opposed passageways formed therein to which respective first and second check valves are connected and a piston disposed within the cylinder which is actuated each time the handles of the implement are closed and wherein a spring means is provided for returning the piston to its original position when the handles are opened. The first check valve is adapted to be connected to a pipe extending from a suitable source of liquid, such as herbicide, disinfectant or the like and is so arranged as to permit ingress of the liquid as the piston returns to its normal inactive position. The second check valve is so arranged as to permit emission of the liquid from within the cylinder when the handles of the implement are moved to closed position, a conduit being connected to the latter check valve for directing the liquid so emitted to a point adjacent the blades of the cutting implement.

Some of the objects of the invention having been stated, other objects will appear as the description proceeds when taken in connection with the accompanying drawings, in which—

Figure 1 is an inverted plan view of an implement of the character disclosed in said copending application showing the improved pump structure in association therewith and showing a source of liquid for the pump somewhat schematically;

Figure 2 is an enlarged fragmentary view of the improved pump structure showing a portion of one of the handles of the implement in association therewith and being taken looking substantially along line 2—2 in Figure 1;

Figure 3 is a sectional view through the improved pump structure taken substantially along line 3—3 in Figure 2;

Figure 4 is an enlarged transverse sectional view through the pump taken substantially along the line 4—4 in Figure 1;

Figure 5 is a fragmentary sectional view taken substantially along the line 5—5 in Figure 3.

Referring more specifically to the drawings, the improved pump structure is shown in association with an implement of the character disclosed in said Patent 2,726,484. The severing and fluid applying implement comprises a pair of pivotally connected shearing elements or blades 10, 11 having respective handle members 12 and 13 suitably secured thereto, which handle members are preferably substantially U-shaped in cross-section and are held in normally open position by a spring 16. The blades 10 and 11 are provided with sharpened edges 17, 18 and the edge 18 may be cut away, as at 20, if desired, and the curved edge of the cut away portion is also preferably sharp.

As is the case in said patent a fluid confining means is provided in association with the blades 10 and 11 which confining means is in the form of a pair of semi-cup-like or half-cup-like members 22 and 23 which project outwardly from the respective blades 10, 11. The outer ends of the semi-cup-like members 22, 23 are cut away to form substantially semi-circular recesses 24, 25 therein so that, when the blades 10 and 11 are closed, the members 22, 23 will meet to form a cup having a circular opening in the base thereof.

The walls of the semi-circular cavities or recesses 24, 25 in the respective cups 22, 23 are so shaped as to engage or closely surround the outer periphery or bark portion of a stalk or stem to be cut. In order to introduce fluid, such as disinfectant or herbicide, to the stalk or stem being cut, a pipe or conduit 30 of rigid material is provided, one end of which is communicatively connected to one of the semi-cup-like members; the member 23 in this instance. The conduit 30 is formed in an S shape and extends through the space between the handle 13 and the blade 11 at the juncture thereof, as shown in Figure 1. A portion of the conduit 30 is thus disposed within the confines of the U-shaped handle 13. The other end of the pipe or conduit 30 is connected to the improved pump structure, broadly designated at 31, by means to be later described.

The improved pump structure 31 comprises a cylinder 32, one end of which is closed, as at 33 (Figures 3, 4 and 5) and the other end of which is provided with a cap or cylinder head 34 threadably mounted thereon. The closed end 33 of the cylinder 32 has a diametrically extending relatively narrow projection 35 thereon which fits between opposed side portions of the U-shaped handle 13 and is secured to the U-shaped handle 13, by any suitable means such as a bolt 36. A pair of tubular valve fittings 40 and 41 are connected to opposite sides of the closed portion 33 and the diametrically extending projection 35 of the cylinder 32 in substantially axial alinement with each other.

The valve fittings 40 and 41 are provided with respective ball check valves 42 and 43. It should be noted that the ball check valve 42 is so arranged as to permit fluid to flow through the fitting 40 into the cylinder 32 through a passageway 44, but will prevent fluid from passing out of the passageway 44 in the opposite direction through the fitting 40. On the other hand, the ball check valve 43 is so arranged as to permit fluid to pass from within the cylinder 32 through a passageway 45 and outwardly through the fitting 41, but it will prevent fluid or air from passing inwardly through the fitting 41 and through the passageway 45 into the cylinder 32.

The flared end of the tube or conduit 30 remote from the semi-cup-like member 23 is connected to the fitting 41 by means of a nut 46 threadably mounted on the outer end of the fitting 41. The fitting 40 has one end of a pipe, conduit or tube 47, which is preferably flexible, connected thereto, which extends to a suitable source of liquid such as liquid disinfectant or herbicide embodied in a reservoir 50 having a supply of liquid L therein and, if desired, an auxiliary pump 51 may be placed between the reservoir 50 and the fitting 40 to provide additional pressure for the fluid flowing through the pipe line or tube 47.

Mounted for longitudinal sliding movement in the cylinder 32 is a piston 52 which is preferably made from a pair of opposed resilient cup-shaped members or cup leathers 53 fixed on the inner end of a piston rod 54.

The piston rod 54 slidably penetrates a tubular guide 55 which may be integral with the cylinder head 34, but is shown in Figure 3 as though threadably penetrating the cylinder head 34. The tubular screw or guide 55 is particularly provided for adjusting the effective stroke of the piston 52, and since the piston 52 may engage the guide 55 it can be adjusted to limit outward movement of the piston 52. A compression spring 56, which is shown in Figure 3 as being of the barrel type, surrounds the exposed portion of the tubular guide 55 and the outer portion of the piston rod 54. One end of the compression spring 56 bears against the outer surface of the cylinder head 34 and the other end thereof bears adgainst a suitable abutment provided on the outer end of the piston rod 54. In this instance, the abutment is shown in the form of a lock nut 57 whose outer surface is engaged by an acorn nut 60, the nuts 57 and 60 being threadably mounted on the outer portion of the piston rod 54. Thus, the compression spring 56 normally urges the piston 52 outwardly or away from the closed end 33 of the cylinder 32.

It should be noted that, when the blades 10 and 11 are in the open position shown in Figure 1, the outer end of the abutment 60 on the piston rod 54 is spaced from the handle 12 and is engaged by the handle 12 when the handles 12 and 13 are moved toward each other.

In this instance, any fluid which is in the interior of the cylinder 32 between the piston 42 and the cylinder closure portion 33 will be forced outwardly through the passageway 45 as the piston 52 is moved from bottom to top in Figure 3. The pressure of the fluid on the check valve 43 will open the same, permitting the fluid within said above-defined area to be emitted in a short positive spurt through the tube 30 to the blades 10 and 11 for application to the plant during the cutting of the plant.

When the handles 12 and 13 are released, the spring 16 causes the same to move apart and, as the handle 12 moves out of engagement with the abutment 60 on the free end of the piston rod 54, the compression spring 56 urges the piston 52 back toward the cylinder head 34. In order to permit displacement of air between the piston 52 and the cylinder head 34 during reciprocation thereof, the cylinder head 34 is provided with a small opening or aperture 61. Upon each backward or intake stroke of the piston 52, suction will cause the ball check valve 42 to move away from its seat and permit fluid, flowing through the tube 47, to flow through the fitting 40 into the area between the piston 52 and the closure portion 33 of the cylinder 32. Thus, upon each release stroke or intake stroke, the cylinder 32 will again be filled with liquid ready for a positive emission upon the next pressure stroke.

By adjusting the externally threaded tubular guide member 55 relative to the cylinder head 34, the effective stroke of the piston 52, upon each closure of the handles 12, 13 can be regulated, thus permitting regulation of the amount of fluid to be emitted through the conduit 30, since it is apparent that the handles 12 and 13 can only be moved toward each other to a distance determined by the position of the blades 10 and 11 when closed and it follows, therefore, that the intake stroke of the piston 52 can be determined by its engagement with the inner end of the threaded sleeve or guide member 55.

It is thus seen that I have provided an improved pump structure for use in association with a combination plant stem severing implement and liquid applicator which pump structure will draw into the cylinder 32 thereof a predetermined amount of liquid each time the handles are released from a closed position, and which will force a predetermined amount of fluid outwardly through the pipe or conduit 30 each time the handles 12 and 13 are moved to closed position. Thus, each time the blades 10 and 11 are moved to closed position, fluid is introduced within the confines of the semi-cup-like members 22, 23 whereupon it swirls around the interior walls of the members 22, 23 and is substantially confined against running down the stalk or stem being cut. This results in thorough saturation of the upper portion of the stalk around the entire periphery thereof. Thus, the liquid flows around the periphery of the stalk while the cutting blades 10, 11 are held in close position and substantially cover and protect the cut portion of the stalk so that very little, if any, of the disinfectant or liquid will enter into the cut area.

In the drawings and specification there has been set forth a preferred embodiment of the invention and, although specific terms are employed, they are used in a generic and descriptive sense only and not for purposes of limitation, the scope of the invention being defined in the claims.

I claim:

1. In a clipping implement having a pair of pivotally connected members provided with blades thereon for cutting the stalks of plants and the like; the combination therewith of a pump structure for automatically delivering a predetermined amount of fluid under a minimum pressure to the stalk simultaneously with the cutting thereof, said pump structure comprising a closed cylinder having one end fixed to one of said members, first and second substantially alined tubular fittings communicatively connected to said cylinder adjacent said one end, first and second conduits attached to the respective first and second fittings and respectively leading to a source of liquid and to a point adjacent said blades, a fluid-ingress-permitting check valve in the first fitting, a fluid-egress-permitting check valve in the second fitting, a spring-pressed piston in said cylinder normally urged away from said one end thereof, and a piston rod connected to said piston, extending outwardly through the other end of said cylinder and being engageable by the other of said members when the pivotally connected members are moved toward each other.

2. In a clipping implement having a pair of pivotally connected handles provided with blades thereon for cutting stalks of plants and the like and at least one of the handles being substantially U-shaped in cross-section; the combination therewith of a pump structure for automatically delivering a predetermined amount of fluid under a minimum pressure to the stalk simultaneously with the cutting thereof, said pump structure being so constructed as to fit neatly between said handles and comprising a closed cylinder, a diametrically extending outwardly projecting portion on one end of the cylinder adapted to fit in the U-shaped handle, fastening means extending through said portion and opposite legs of the U-shaped handle, first and second fittings connected to opposite ends of said portion and communicating with the interior of said cylinder, said first and second fittings being at least partially disposed within the U-shaped handle, first and second conduits attached to the respective first and second fittings and respectively leading to a source of liquid and to a point adjacent said blades, a fluid-ingress-permitting check valve in the first fitting, a fluidegress-permitting check valve in the second fitting, a spring-pressed piston in said cylinder normally urged away from said one end thereof, and a piston rod connected to said piston, extending outwardly through the other end of the cylinder and being engageable by the other handle when the handles are moved toward each other.

3. In a clipping implement having a pair of pivotally connected members provided with mating blades thereon for cutting stalks of plants and the like; the combination of a pump for automatically delivering a predetermined amount of fluid under a minimum pressure to the stalk simultaneously with the cutting thereof, said pump comprising a closed cylinder having one end fixed to one of said members, first and second substantially alined diametrically opposed fittings communicatively connected to said one end of said cylinder, first and second check valves in the respective first and second fittings, a first conduit leading from a source of liquid and connected to the outer end of the first fitting, a second conduit connected to the second fitting and leading to a point adjacent the mating blades, a piston disposed in said cylinder, resilient means normally urging said piston away from said closed end of the cylinder, a piston rod fixed to said piston and extending outwardly therefrom and adapted to be engaged by the other of said pivotally connected members when the latter members are moved toward each other to thereby move the piston toward said one end of said cylinder whereby the resilient means will move the piston away from the closed end of said cylinder when said pivotally connected members are moved apart from each other, the first check valve being so arranged as to prevent passage of fluid outwardly therethrough with inward movement of said piston, and the second check valve being so arranged to prevent air from entering the cylinder through the second fitting when the piston moves away from the closed end of said cylinder.

4. In a clipping implement having a pair of pivotally connected members provided with mating blades thereon for cutting the stalks of plants and the like; the combination of a pump for automatically delivering a predetermined amount of fluid under a minimum pressure to the stalk simultaneously with the cutting thereof, said pump structure comprising a cylinder having a closed end fixed to one of said pivotally connected members, first and second opposed fittings connected to the closed end of said cylinder, first and second check valves in the respective first and second fittings, a first conduit leading from a source of liquid and connected to the outer end of the first fitting, a second conduit connected to the second fitting and leading to a point adjacent the mating blades, a piston disposed in said cylinder, spring means normally urging said piston away from said closed end of the cylinder, said closed end of the cylinder having first and second passageways therein communicating with the first and second fittings respectively, a piston rod fixed to said piston and extending outwardly therefrom and adapted to be engaged by the other of said pivotally connected members when the latter members are moved toward each other to thereby move the piston toward the closed end of said cylinder, whereby the spring means will move the piston away from the closed end of said cylinder when said pivotally connected members are moved apart from each other, the first check valve being so arranged as to permit passage of fluid into the cylinder when said piston moves outwardly away from the closed end of the cylinder, but to prevent passage of fluid outwardly therethrough with inward movement of said piston, and the second check valve being so arranged as to permit fluid to pass outwardly through the second fitting and the second conduit with inward movement of the piston, but to prevent fluid from entering the cylinder through the second fitting when the piston moves away from the closed end of said cylinder.

References Cited in the file of this patent

UNITED STATES PATENTS

| | | |
|---|---|---|
| 773,743 | Von Hoffmann | Nov. 1, 1904 |
| 1,063,143 | Vincent | May 27, 1913 |
| 1,917,193 | Hueber et al. | July 4, 1933 |
| 2,233,460 | Stahl | Mar. 4, 1941 |

OTHER REFERENCES

"The Clip-Oil," published October 1950, Information Series No. 3, by Dept. of Agricultural Engineering, N. C. Agr. Expt. Sta., Raleigh, N. C.; 17 pages.